United States Patent
Carpenter, IV (10) Patent No.: US 11,177,970 B2
(45) Date of Patent: Nov. 16, 2021

(54) PERSONALIZED VIDEO CALLS

(71) Applicant: Roy E. Carpenter, IV, New Fairfield, CT (US)

(72) Inventor: Roy E. Carpenter, IV, New Fairfield, CT (US)

(*) Notice: Subject to any disclaimer, the term of this patent is extended or adjusted under 35 U.S.C. 154(b) by 211 days.

(21) Appl. No.: 16/653,307

(22) Filed: Oct. 15, 2019

(65) Prior Publication Data

US 2021/0111917 A1   Apr. 15, 2021

(51) Int. Cl.
  *H04L 12/18*  (2006.01)
  *H04N 7/15*   (2006.01)
  *H04N 7/14*   (2006.01)

(52) U.S. Cl.
  CPC ...... *H04L 12/1831* (2013.01); *H04L 12/1822* (2013.01); *H04N 7/147* (2013.01); *H04N 7/152* (2013.01)

(58) Field of Classification Search
  None
  See application file for complete search history.

(56) References Cited

U.S. PATENT DOCUMENTS

| | | |
|---|---|---|
| 2002/0109770 A1 | 8/2002 | Terada |
| 2007/0107008 A1 | 5/2007 | Dybus |
| 2009/0010485 A1 | 1/2009 | Lamb et al. |
| 2011/0310796 A1 | 12/2011 | Um et al. |
| 2013/0326373 A1* | 12/2013 | Lisabeth ............ H04L 51/32 715/753 |
| 2014/0317508 A1 | 10/2014 | Wolzien |
| 2016/0364731 A1* | 12/2016 | Ushiki ........ G06Q 10/063112 |
| 2018/0331838 A1* | 11/2018 | Albrecht ............ H04L 51/22 |
| 2020/0017050 A1* | 1/2020 | Kim .............. B60R 21/01534 |

OTHER PUBLICATIONS

International Search Report and Written Opinion of the International Searching Authority; Application No. PCT/US20/55648; Completed: Dec. 16, 2020; dated Jan. 12, 2021; 6 Pages.

* cited by examiner

*Primary Examiner* — Angela Nguyen
(74) *Attorney, Agent, or Firm* — Whitmyer IP Group LLC (57) ABSTRACT

A system for facilitating interactive and personal video communication between notable individuals and members of the public, including interaction that is tailored to the individual member of the public, the video interaction able to be monitored and controlled by a third party.

16 Claims, 8 Drawing Sheets

PERSONALIZED VIDEO CALLS

TECHNICAL FIELD

The present teaching is related to the field of video interactions between notable individuals, such as fictional characters or non-fictional celebrities, and the public. Frequently members of the public must travel long distances and wait in long lines to interact with famous people in person. The system and device disclosed herein relates to facilitating interactive, tailored video interactions between notable individuals and other individuals through video communication methods and allowing this video interaction to be monitored and controlled by a third party.

BACKGROUND

Notable individuals that rely on a certain amount of fame and notoriety depend on interaction with the average people to remain relevant and to obtain job opportunities. In turn, average people often desire to meet and interact with these notable individuals in a one-on-one scenario. Often, the average person has to travel long distances at great expense to where the notable individual has scheduled an appearance. In these cases, individual one-on-one interaction is limited or impossible due to scheduling, cost, or the number of people that appear at these scheduled appearances hoping to interact with the notable individual. Even if one-on-one interaction is attainable, the interaction can be topical and impersonal because neither party knows much about the other.

As such, there is a need for a system and device that allows the average person and a notable individual to communicate in a one-on-one scenario while avoiding the time and cost of traveling to see the notable individual in person. There is also a need for a system that facilitates an exchange of information so that the notable person can learn about the average person and interact with them on a more personal level.

SUMMARY

The needs set forth herein as well as further and other needs and advantages are addressed by the present embodiments, which illustrate solutions and advantages described below.

The system of the present embodiment includes, but is not limited to the following embodiments.

In one embodiment can be a system facilitating video engagement including a computer, a database of people accessible by said computer, a request to arrange a video engagement with a person received by said computer from a third party, the person selected by the third party from the database of people, personal information about a participant in the requested video engagement received by said computer, and a video engagement between the person and the participant which can be monitored by the third party, the video engagement using said personal information.

Another embodiment can also include the database of people including fictional characters.

Another embodiment can include call and time information input by the third party.

Another embodiment can include payment authorization information input by the third party.

Another embodiment can include the computer transmitting marketing interaction to the third party.

Another embodiment can include the person transmitting marketing interaction to the computer.

Another embodiment can include the computer recording the video engagement between the person and the participant and the computer storing the engagement in a calls database.

Another embodiment can include a second computer wherein the third party transmits information regarding at least one of the person selected and personal information about the participant.

Another embodiment can include the third party joining the video engagement between the person and the participant.

Another embodiment can include the third party communicating with the person, exclusive of the participant, while the video engagement is in progress.

Another embodiment can include the third party discontinuing the video engagement.

Other embodiments of the system and method are described in detail below and are also part of the present teachings.

DETAILED DESCRIPTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems and methods herein disclosed comprise preferred forms of putting the present teachings into effect.

For purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to a/an/the element, apparatus, component, means, step, etc. are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second," etc. for different features/components of the present disclosure are only intended to distinguish the features/components from other similar features/components and not to impart any order or hierarchy to the features/components.

To aid the Patent Office and any readers of any patent issued on this application in interpreting the claims appended hereto, Applicant that it does not intend any of the appended claims or claim elements to invoke 35 U.S.C. 112(f) unless the words "means for" or "step for" are explicitly used in the particular claim.

A notable advantage to providing video engagements between notable individuals and participants is the ability to efficiently and economically allow average people to interact with notable individuals they otherwise would have to travel long distances at great expense to interact with in person. Providing video engagements allows participants to not only see and hear notable individuals, but to also interact with these individuals. This interactions allows the notable individuals to tailor their interaction with the participants, providing a more fulfilling and memorable experience for the participant. Notable individuals can include, but are not limited to, fictional characters, non-fictional characters, celebrities, authors, musicians, artists, politicians, and any other individual or group of individuals that a person could desire to interact with.

Figure 1:
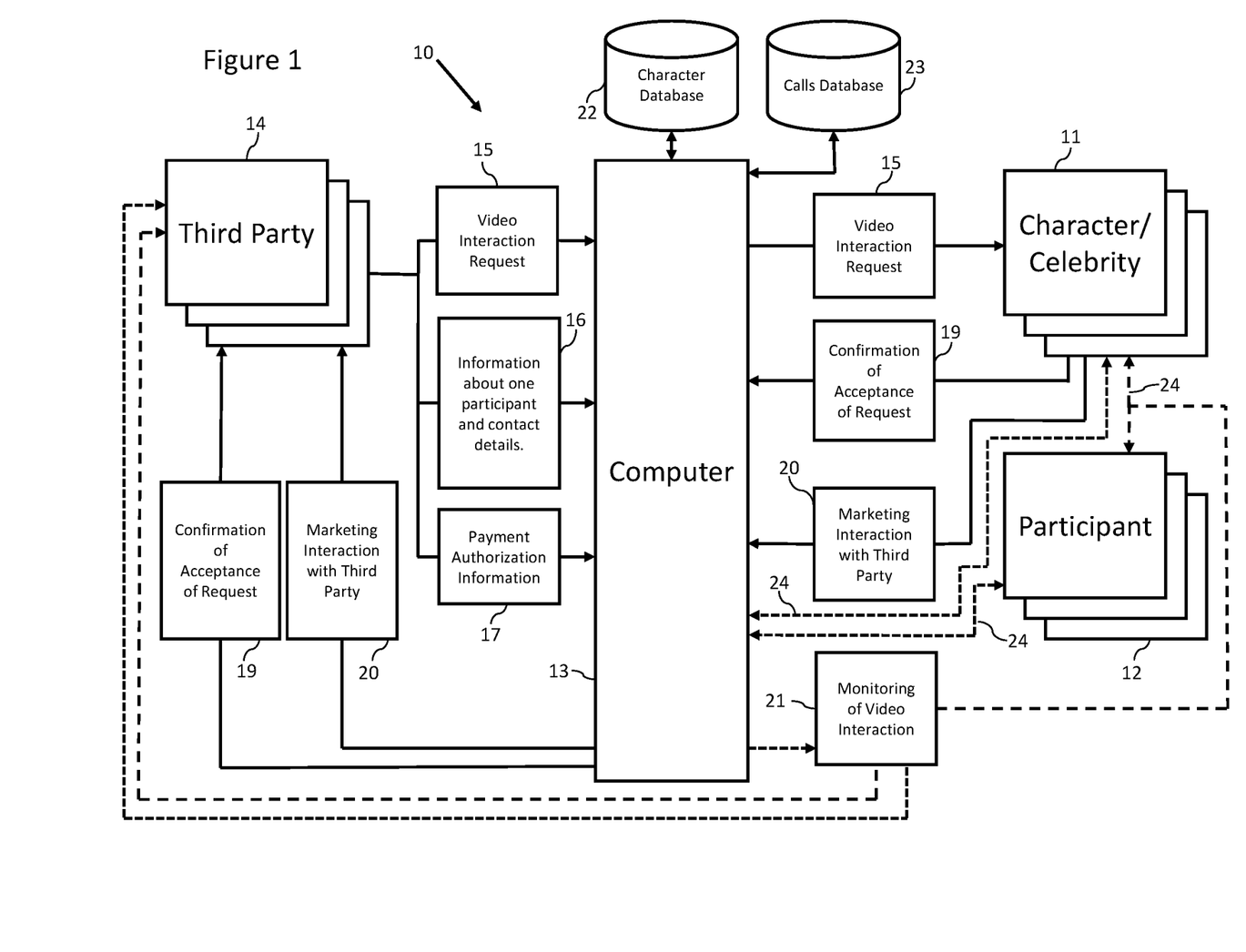
FIG. 1 is an embodiment of a system that facilitates monitored video interaction between a character and a participant. Video interaction can take place directly between the character and the participant or video interaction can pass through a central computer then to the character and the participant.

Referring to FIG. 1, an embodiment of a system 10 providing video engagements between a participant and a character is shown. As stated above, the system 10 can facilitate interactions between and average person (participant) and any notable individual or group of individuals. The system 10 is not limited to only providing interaction with characters.

The system 10 can include a central computer 13, a third party device 14, a character device 11, a character database 22, a calls database 23, and a participant device 12. The third party device 14 can interact with the central computer 13, the character device 11, and/or the participant device 12. The third party device 14, character device 11, and participant device 12 can each be, but are not limited to, a telephone or a computer. A computer, for the purpose of the third party, character, or participant devices, can include a laptop computer, desktop computer, cell phone, smartphone, tablet computer, personal assistant device, virtual reality device, video game console, electronic multimedia device, or any other device that can accept information from a user and transmit it to another device. The third party and participant devices 14, 12 can be the same device or separate devices.

The participant device 12 and the character device 11 can allow users to interact through their devices using video calling. Examples of video calling methods include, but are not limited to, Skype, Facetime, Whatsapp, Google Hangouts, WeChat, Google Duo, Viber, Facebook Messenger, Instagram, and Snapchat. Any other video calling method that allows for two parties to interact through bidirectional exchange of video information would be suitable for the purposes for the disclosed system.

The third party device 14 can have an interface or software 30 that allows a user to prepare and transmit a video interaction request 15 to the central computer 13. This request 15 can contain information required to schedule an interaction between a character through a character device 11 and a participant through a participant device 12. This information can include, but is not limited to, desired time of interaction, desired character to interact with the participant, desired topics of interaction, personal information about the participant 16, personal information about a third party, contact details 16, and any other information that is needed to facilitate a memorable interaction between a character and a participant. Further, the third party device 14 can accept and transmit information about a participant and contact details 16 to a central computer 13 separately from the video interaction request 15.

The central computer 13 can transmit the video interaction request 15 to the character device 11 for confirmation. The character device 11 can have an interface or software 50 that allows a user to view the request 15 and confirm acceptance of the request. Upon confirmation, the character device 11 can send a confirmation of acceptance of request 19 to the central computer. In turn, the central computer 13 can send the confirmation of acceptance 19 to the third party device 14. The video interaction request 15 and confirmation of acceptance of request 19 can be transmitted as an electronic message including, but not limited to, a push notification, email, SMS text message, MMS message, or any other message known in the art for communicating information from electronic device to electronic device.

A third party, through a third party device 14, can monitor the interaction between the character and the participant by monitoring the interaction video data feed 24. An interface 30, 50, 60 or computer program on the character's device 11 or the participant device 12, or both devices, can send the interaction video data feed 24 to the third party device 14. The interaction video data feed 24 can originate from a video call through methods including, but not limited to, Skype, Facetime, Whatsapp, Google Hangouts, WeChat, Google Duo, Viber, Facebook Messenger, Instagram, Snapchat, or any other video calling method known in the art. As explained in subsequent figures, the third party device 14 can have an interface 30 or computer program 30 that allows the third party device 14 to manipulate the video interaction data feed 24 between the character and participant devices 11, 12. Further, the third party device 14 can have an interface or software 30 that allows the third party device 14 to initiate communication with either the participant device 12 or the character device 11 or both the participant and the character devices 12, 11.

The system 10 can have a database that stores a list of characters 22 that a third party can select from, using the third party device 14, to interact with the participant on the participant device 12. The character database 22 can be updated by the central computer 13 to include information about each character. This information can include, but is not limited to, which characters are available for interactions, what times characters are available for interactions, subjects each character can address, age groups of participants the character is best suited to interact with, or any other characteristic of the character that can be considered when ordering an interaction for a participant. The database can be local to or remote from the central computer 13.

The system can have a database that stores recordings of the video interactions called a calls database 23. The central computer 13 can record video interactions and transmit them to the calls database 23 for storage. Alternatively, the video interaction data feed 24 can be recorded by a character device 11, participant device 12, or third party device 14 and transmitted to the central computer 13, the central computer 13 in turn transmitting the video interaction data feed 24 recording to the calls database 23 for storage. The calls database 23 can store the whole recording, or only a portion of the recording. The calls database 23 can store metadata related to the video recording. The metadata can be generated by the recording device during recording of the video interaction data feed 24 or after recording has been completed. The calls database 23 can store the recording according to a storage policy indefinitely or for a definite amount of time. The recording storage policy can be set by the central computer 13. The calls database 23 can be local to or remote from the central computer 13.

At any time before, during, and after the video interaction between the character and the participant, marketing interaction materials 20 can be transmitted to the third party device 14. These materials 20 can be transmitted through push notification, email, SMS text message, MMS message, or any other message known in the art for communicating information from electronic device to electronic device. Marketing materials 20 can include, but are not limited to, text, video, audio, graphic media, and combinations thereof. The marketing materials 20 can be selected by the central computer, the character, or another party. Selection of marketing materials 20 can be based on the information 15, 16, 17 input by the third party 14 to schedule and initiate the video interaction, the video interaction itself, information regarding the third party, or any other information known in the art to aid in selecting and delivering marketing materials to consumers. The marketing materials can be transmitted by the character device 11 to the central computer 13, the central computer 13 in turn transmitting the materials 20 to the third party device 14. Alternatively, the marketing materials 20 can originate from the central computer 13 and the central computer 13 can transmit the marketing materials 20 to the third party device 14.

Alternatively, as illustrated by small dashed lines in FIG. 1, the character device 11 and participant device 12 can interact over video calling through the central computer 13. The character device 11 and the participant device 12 can transmit and receive the video interaction data feed 24 to the central computer 13. The video interaction data feed 24 that is transmitted to the central computer 13 from the character device 11 is in turn transmitted to the participant device 12 by the central computer 13. The video interaction data feed 24 that is transmitted to the central computer 13 from the participant device 12 is in turn transmitted to the character device 11 by the central computer 13.

The video interaction data feed 24 can originate from a video call over methods including, but not limited to, Skype, Facetime, Whatsapp, Google Hangouts, WeChat, Google Duo, Viber, Facebook Messenger, Instagram, Snapchat, or any other video calling method known in the art.

The third party device 14 can receive the video interaction data feed 24, allowing a user to monitor the interaction, between the character device 11 and the participant device 12 by receiving the video interaction data feed 24 from the central computer 13. The central computer 13 can transmit the video interaction data feed 24 received from the character device 11, or the participant device 12, or both the character and participant devices 11, 12 to the third party device 14. As explained in subsequent figures, the third party device 14 can have an interface or computer program 30 that allows the third party device 14 to manipulate the video interaction data feed 24 between the character device 11 and the participant device 12. Further, the third party device 14 can have an interface 30 that allows the third party device 14 to initiate communication with either the participant device 12 or the character device 11 or both the participant and the character devices 11, 12.

The system can have a database 22 that stores a list of characters that a third party can select from to interact with the participant. The character database 22 can be updated by the central computer 13 to include information about each character. This information can include, but is not limited to, which characters are available for interactions, what times characters are available for interactions, subjects each character can address, age groups each character is best suited to interact with, and any other data relevant to the characters. The character database 22 can be local to or remote from the central computer 13.

The system 10 can have a database 23 that stores recordings of the video interaction data feeds 24. The central computer 13 can record video interaction data feeds 24 and transmit them to the calls database 23 to store them. The video interaction data feed 24 can also be recorded by a character device 11, participant device 12, or third party device 14 and transmitted to the central computer 13, the central computer 13 in turn transmitting the video interaction data feed 24 recording to the calls database 23 for storage. The calls database 23 can store the whole recording or only a portion of the recording. The calls database 23 can store the recording indefinitely or for a definite amount of time. The recording storage policy can be set by the central computer 13. The calls database 23 can be local to or remote from the central computer 13.

Figure 2:
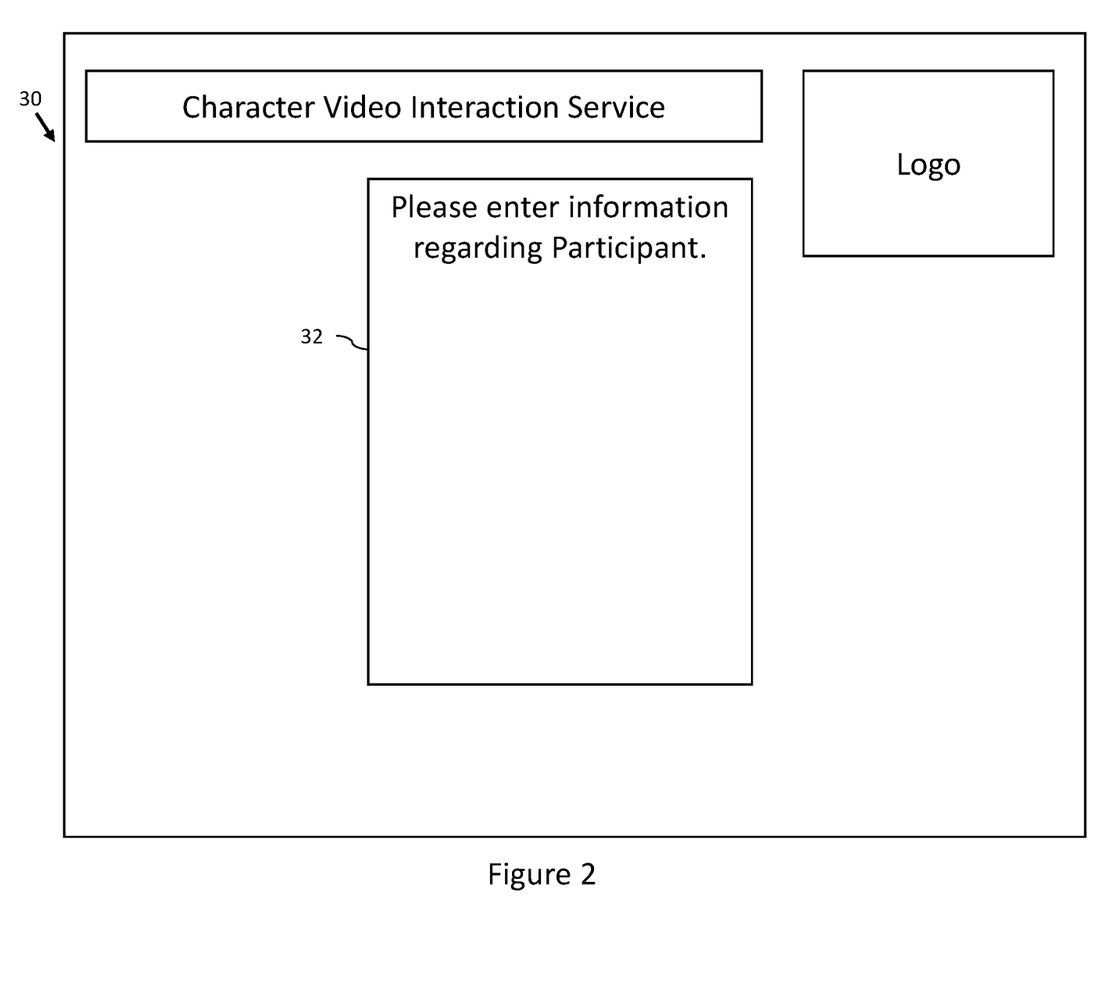
FIG. 2 is an illustration of an embodiment of an interface displayed on a third party device. The illustration shows a space provided by the interface that requests and accepts information regarding a participant.

Referring to FIG. 2, an interface 30 that can be displayed on the third party device 14 is shown. The interface 30 can be provided by the central computer 13 over a communication network or provided as software on the third party device 14. A prompt for information regarding the participant 32 is displayed. Areas for the third party to input information regarding the participant are provided in the prompt 32. Information regarding the participant 16 can include, name, age, gender, interests, birthdate, and desired topics of a conversation. Interests can include subjects the participant likes to talk about including, but not limited to, sports, games, toys, animals, travel, people, automobiles, motorcycles, boats, real estate, or any other subject a person can be interested in. Interests can also include, but are not limited to favorite color, shape, toy, sport, game, fictional character, non-fictional character, person, animal, car, motorcycle, boat, place, or any other item or person a person can find interest in or have a preference for.

The third party device 14 can accept information regarding one or more desired topics of conversation. These topics can include, but are not limited to, sports, games, toys, animals, travel, people, automobiles, motorcycles, boats, real estate, or any other subject a person can be interested in. Topics can also include, but are not limited to favorite color, shape, toy, sport, game, fictional character, non-fictional character, person, animal, car, motorcycle, boat, place, or any other item or person a person can find interest in or have a preference for. Topics of conversation can be different from interests of the participant that were provided by the third party.

Figure 3:
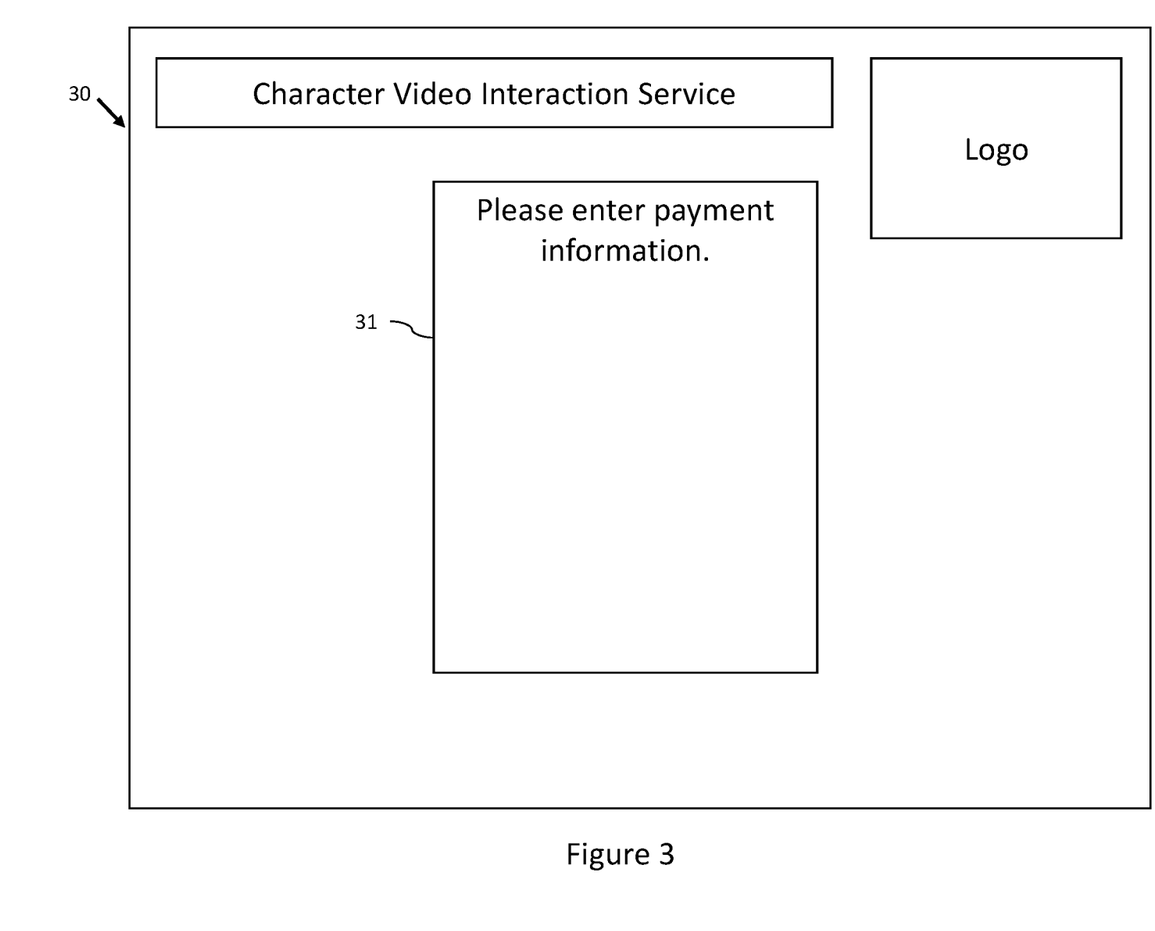
FIG. 3 is an illustration of an embodiment of an interface displayed on a third party device. The illustration shows a space provided by the interface that requests and accepts payment information.

Referring to FIG. 3, the interface 30 displayed on the third party device 14 can include a prompt to enter payment information 31. Payment information 17 can include information sufficient to tender a transaction with a credit card account, PayPal account, Google Wallet Account, iWallet Account, Apple pay account, Venmo account, bank account, gift certificate account, credit account, or any other account or payment method used to conduct transactions through a computer. Payment information 17 input into the third party device 14 can also include a physical or email address to send a bill to for later payment.

Figure 4:
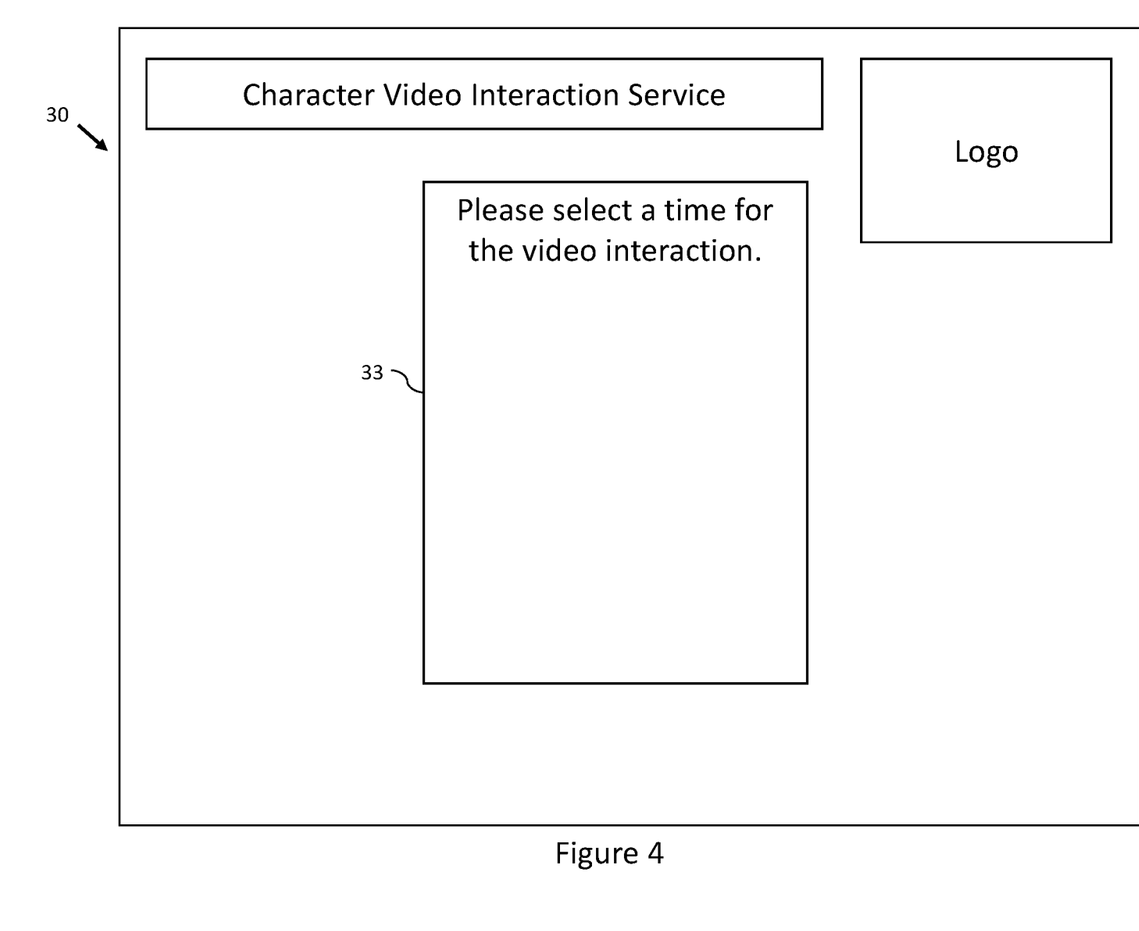
FIG. 4 is an illustration of an embodiment of an interface displayed on a third party device. The illustration shows a space provided by the interface that requests and accepts information regarding scheduling a video interaction.

Referring to FIG. 4, the interface 30 of the third party device 14 can provide a prompt to input information about the desired time and length of the video interaction 33. The interface 30 can provide a list of available dates and times from which a third party may select a time through the third party device 14, or the interface 30 can request the third party input information about a number of dates and times from which the system can select a time. Once a time has been selected, the video interaction can be scheduled by the central computer 13 and stored in a schedule database. The schedule database can be local to or remote from the central computer 13.

Figure 5:
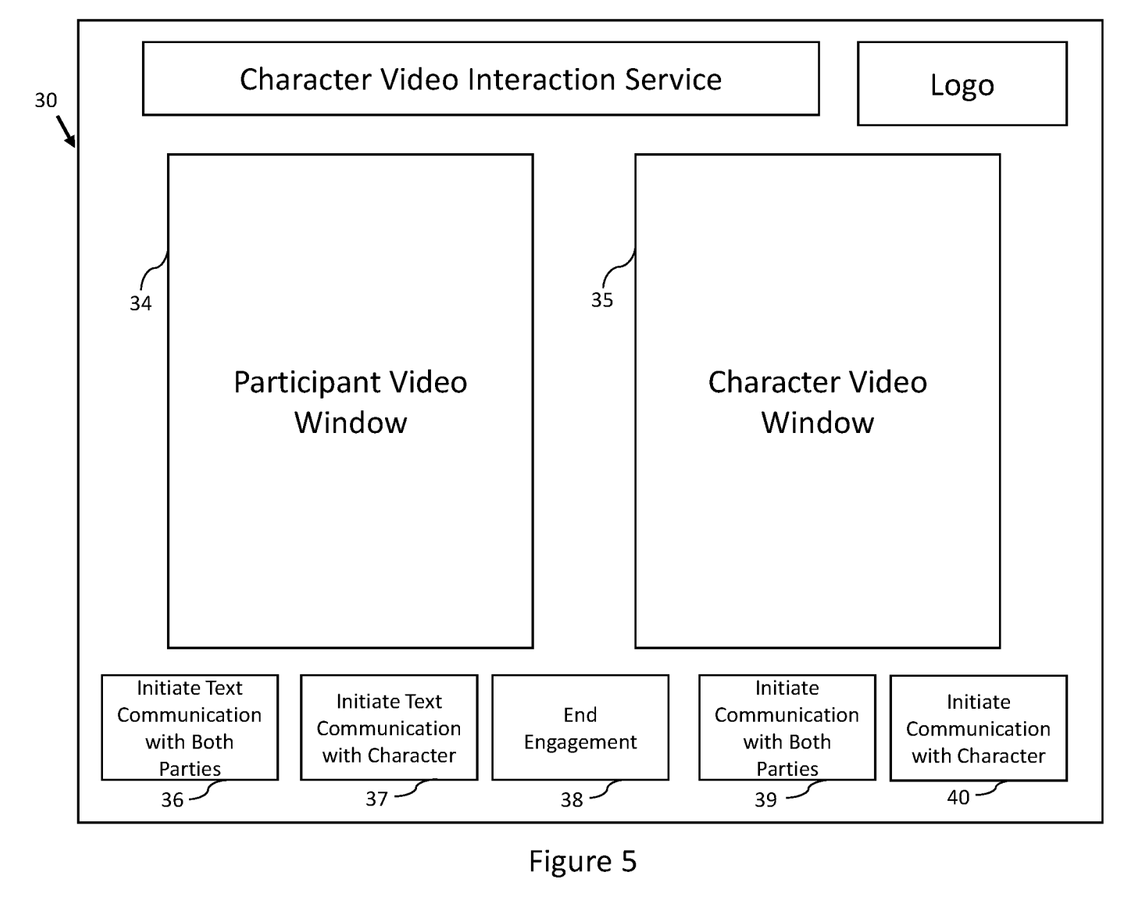
FIG. 5 is an illustration of an embodiment of an interface displayed on a third party device. The illustration shows areas where video interaction feeds can be displayed and multiple controls by which a third party device can control a video interaction and initiate communication with parties to the video interaction.

Referring to FIG. 5, the interface 30 displayed on the third party device 14 can include a participant video window 34, a character video window 35, and radio buttons for ending a video engagement 38, initiating communication with both the third party and the character devices 39, and initiating communication with the character device 40. The participant video window 34 can display video transmitted by the participant device 12 to the character device 11. The character video window 35 can display video transmitted by the character device 11 to the participant device 12.

The third party device 14 can accept input indicating a selection of a radio button ending the video engagement data feed 24 between the participant device 12 and the character device 11. Upon selection of the radio button ending the video engagement data feed 24, video from the participant device 12 is no longer transmitted to the character device 11 and video from the character device 11 is no longer transmitted to the participant device 12.

The third party device 14 can also accept input indicating initiating communication with both the participant and the character. Input initiating a communication can include, but is not limited to, selection of a radio button, check box, bubble, sliding switch, hyperlink, link, drop-down list, or any other method of selecting or activating a function known in the art. When communication is initiated, two-way audio communication, two-way video communication, or two-way text communication can take place between at least one of the third party and the participant, and the third party and the character.

Additionally, communication can be one-way between at least one of the third party device 14 and the participant device 12, and the third party device 14 and the character device 11. Communication can flow from the third party device 14 to another party in the case of one-way communication initiated from the third party interface 30.

Figure 6:
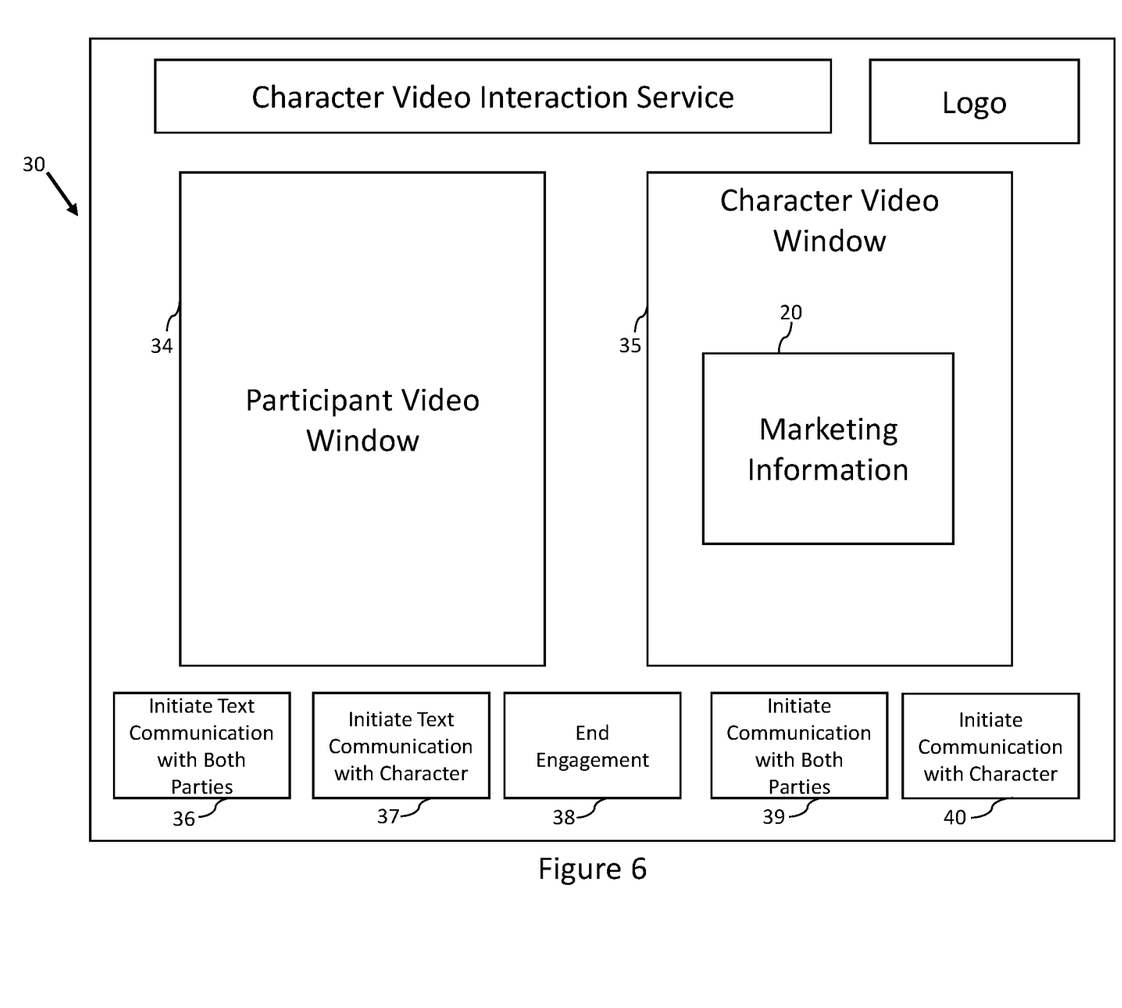
FIG. 6 is an illustration of an embodiment of an interface displayed on a third party device. The illustration shows areas where video interaction feeds can be displayed and multiple controls by which a third party device can control a video interaction and initiate communication with parties to the video interaction. The illustration shows marketing information can be displayed on the third party interface.

Referring to FIG. 6, the interface 30 provided by the central computer 13 and displayed on the third party device 14 is shown. Marketing information 20 directed towards the third party can be displayed on the interface on the third party device. This marketing information 20 can display offers to provide products and/or services, discount offers on products and/or services, or any other information known in the art to market products and/or services to people. The character, through the character device 11, or the central computer 13 can direct marketing information 20 to be transmitted to the third party device 14 and displayed on the third party device interface 30.

Figure 7:
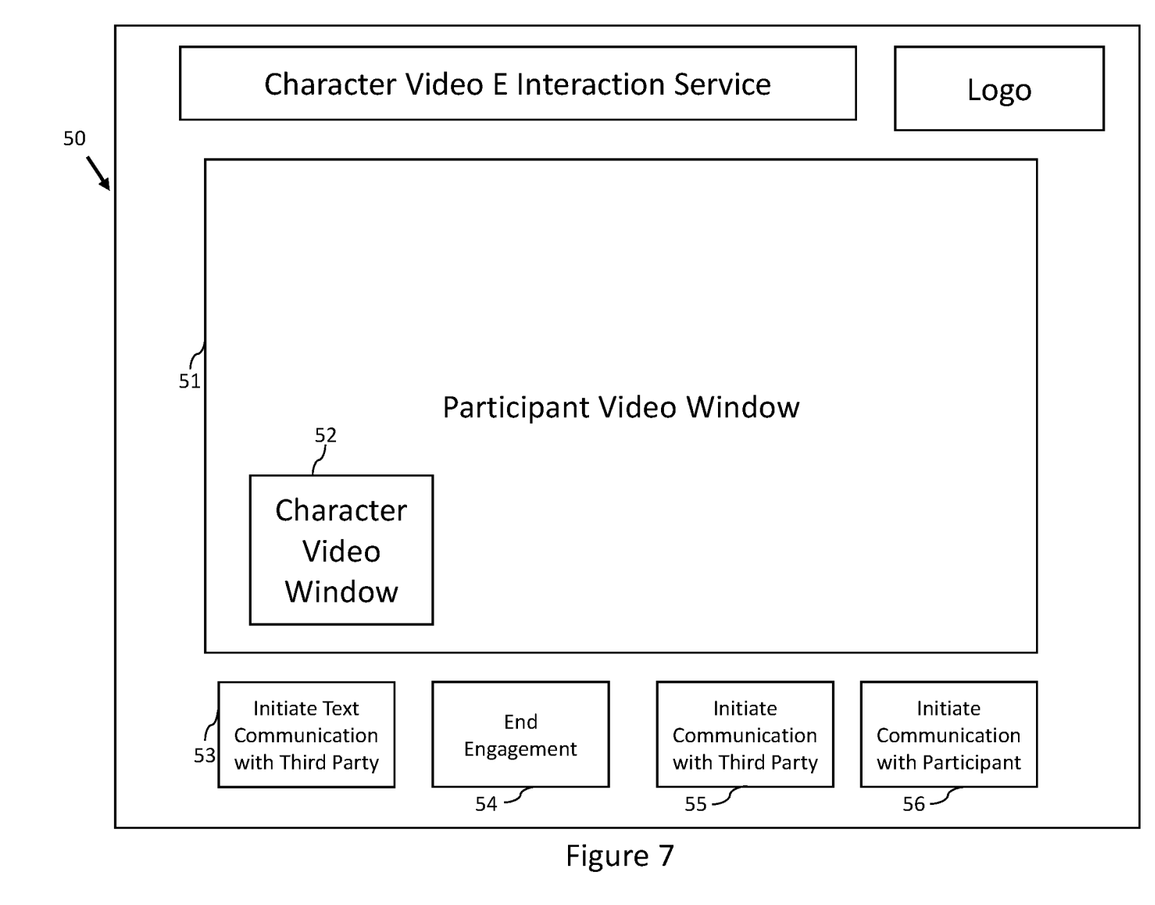
FIG. 7 is an illustration of an embodiment of an interface displayed on a character device. The illustration shows areas where video interaction feeds can be displayed and multiple controls by which a character device can control a video interaction and initiate communication with parties to the video interaction.

Referring the FIG. 7, an interface 50 displayed on the character device 11 is shown. The interface 50 can have a participant video window 51, a character video window 52, and buttons to perform different functions 53, 54, 55, 56. The participant video 51 window and the character video window 52 can be different or the same sizes, separate or overlaid upon each other, or configured anywhere on the interface 50. The character video window 52 is not required and can be hidden or absent from the interface 50.

The character device 11 can accept input indicating a selection of a radio button ending the video engagement data feed 24 between the participant device 12 and the character device 11. Upon selection of the radio button ending the video engagement data feed 24, two-way communication between the devices is terminated. Upon termination, video from the participant device 12 is no longer transmitted to the character device 11 and video from the character device 11 is no longer transmitted to the participant device 12.

The character device 11 can also accept input indicating initiating communication between the participant device 12 and the character device 11. Input initiating a communication can include, but is not limited to, selection of a radio button, check box, bubble, sliding switch, hyperlink, link, drop-down list, or any other method of selecting or activating a function known in the art. When communication is initiated, two-way audio communication, two-way video communication, or two-way text communication can take place between at least one of the third party device 14 and the participant device 12, and the third party device 14 and the character device 11.

Figure 8:
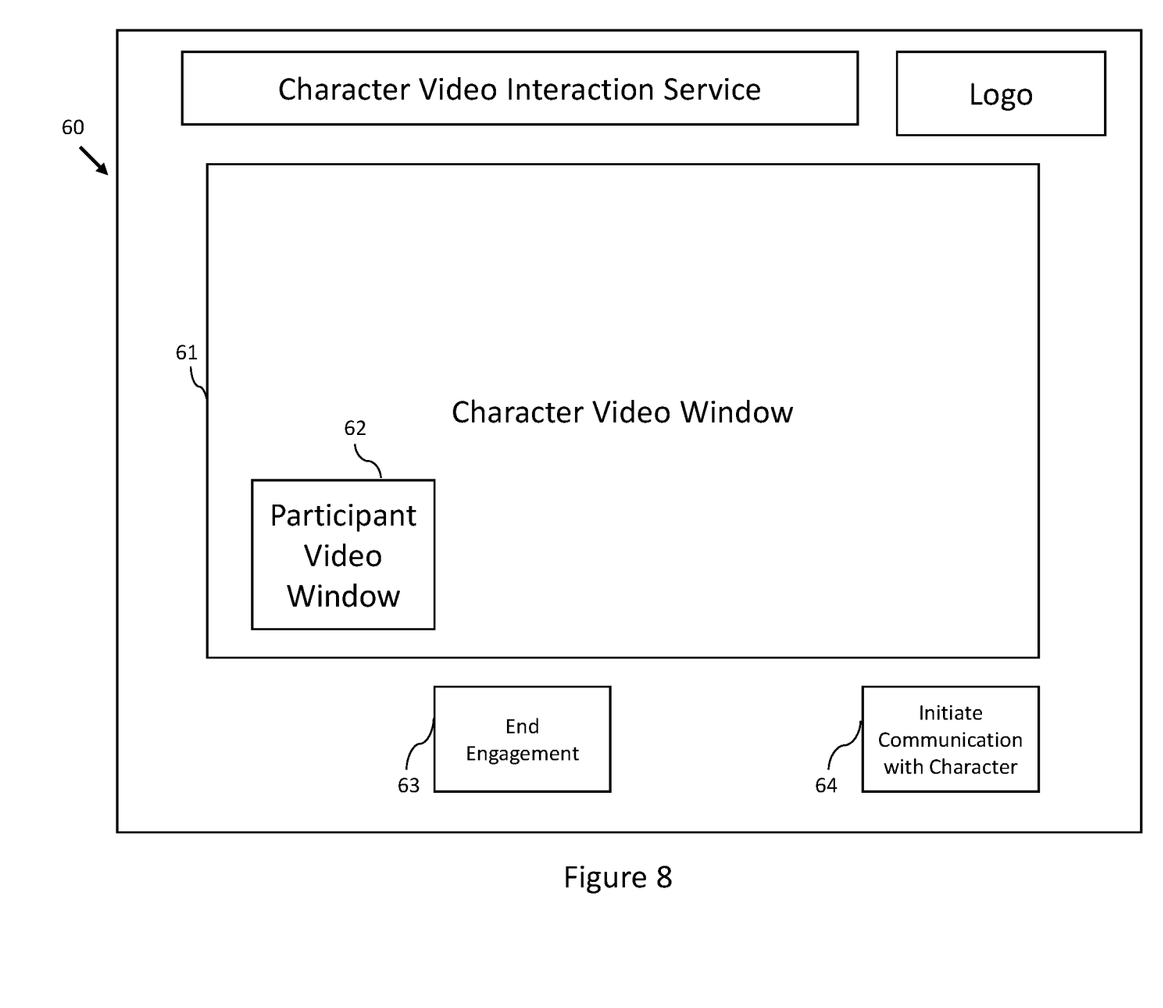
FIG. 8 is an illustration of an embodiment of an interface displayed on a participant device. The illustration shows areas where video interaction feeds can be displayed and multiple controls by which a participant device can control a video interaction and initiate communication with a character device.

Referring to FIG. 8, an interface 60 displayed on the participant device is shown. The interface 60 can have a participant video window 62, a character video window 61, and buttons to perform different functions 63, 64. The participant video window 62 and the character video window 61 can be different or the same sizes, separate or overlaid upon each other, or configured anywhere on the interface 60. The participant video window 62 is not required and can be hidden or absent from the interface 60.

The participant device 12 can accept input indicating a selection of a radio button ending the video engagement data feed 24 between the participant device 12 and the character device 11. Upon selection of the radio button ending the video engagement data feed 24, two-way communication between the devices is terminated. Upon termination, video from the participant device 12 is no longer transmitted to the character device 11 and video from the character device 11 is no longer transmitted to the participant device 12.

The participant device 12 can accept input indicating initiating communication between the participant device 12 and the character device 11. Input initiating a communication can include, but is not limited to, selection of a radio button, check box, bubble, sliding switch, hyperlink, link, drop-down list, or any other method of selecting or activating a function known in the art. When communication is initiated, two-way audio communication, two-way video communication, or two-way text communication can take place between at least one of the third party device 14 and the participant device 12, and the third party device 14 and the character device 11.

A description of one embodiment of the disclosed device follows.

A system 10 for facilitating communication between a child and a cartoon character ("character") is provided. The system 10 exists such that a parent can order a scheduled interaction between the character and the child through video messaging. The child and the character are able to speak to each other and react to each other's interactions.

The system 10 can include a central computer 13 with which all other devices of the system 10 can communicate. The central computer 13 can accept information to process payments 17, schedule interactions 15, communicate with different parties 16, and market products and services.

The interaction is ordered by the parent using a computer 14. The parent interacts with the computer 14 to input information sufficient to schedule an in interaction between a character and the child 15, 16. This information includes, but is not limited to, the desired time of the interaction, the desired method of the interaction (video, audio-only), what service to use for the interaction (skype, Whatsapp, Facebook messenger, facetime, other proprietary video system, etc.), information about the child, desired topic(s) for the interaction, and payment information 17.

Information about the child 16 can include, but is not limited to, age, gender, hair color, height, recent activities, birthday, best friend's name, favorite color, favorite toy, favorite animal, favorite sport, favorite game, name of school, grade level, or any other information about a child that may be useful to create a personalized, memorable, and unique interaction between the character and the child. Desired topics of the interaction can include, but are not limited to, all of the foregoing and events, activities, holidays, people, academics, development goals, milestones, and any other subject a person would discuss with a child. The interface can transmit the entered information to the central computer for storage and processing.

Upon entry of information regarding the desired time of the interaction 15, the child 16, and the topics of interaction, payment information 17 can be input into the interface 30 of the third party device 14. The interface 30 can provide a prompt to enter payment information 31 and areas where the payment information can be input 31. Examples of payment information include, but are not limited to, account numbers, billing addresses, payment methods, verification codes, security codes, electronic signatures, and any other information known in the art to be required to complete an electronic payment. The interface 30 can transmit the entered information to the central computer 13 for processing, recording, and completion of the transaction.

As stated above, the interface 30 of the third party device 14 can provide a way to input information about the desired time and length of the video interaction 33. The interface 30 can provide a list of available dates and times from which a third party may select a time, or the interface 30 can request the third party input information about a number of dates and times from which the system can select a time. Once a time has been selected, the video interaction can be scheduled in the system's 10 scheduling database. This database can be stored in the central computer 10 or in a separate storage device.

When the scheduled time arrives, the system 10 can initiate the interaction between the character and child. The system 10 can also create access for the parent to monitor the interaction between the child and the character. 21 The system 10 can initiate communication with the parties of the interaction separately and individually by transmitting a communication to each party's respective computer 11, 12. Once communication is established, the individual parties can be held in a staging or queuing area while all of the other parties are contacted. Once all of the parties are contacted and staged, the system can connect the parties. Video communication 24 between the child and the character can be established. When this communication 24 is established the child and the character can be able to interact through audio and video means.

The communication between the child and the character can also be transmitted to the parent's computer 14. The video communication 24 from both the child's computer 12 and the character's computer 11 can be sent to the parent's computer 14 and displayed on the parent's computer interface 30. The parent can have options to initiate communication with the character, the child, or all parties at the same time 36, 37, 38, 39, 40. The parent can have options to mute, pause, or terminate 38 the interaction between the child and the character. While the parent is communicating with either party, the parent can have the option to put another party on hold so that the party on hold cannot view the interaction between the parent and the non-holding party.

For example, if the parent would like the character to talk with the child about a certain subject, the parent can have the option to initiate communication with the character and temporarily block the child from the communication. At this time, the parent can communicate with the character without the child hearing or seeing the parent or the character's interactions with the parent. Once the parent has finished interacting with the character, the parent can reconnect the child with the character and the interaction can continue as before.

As a further example, the parent can initiate communication with the character while the character is interacting with the child. Communication between the parent and the character can continue while the character is in communication with the child. Audio and video of the parent's interaction with the character can be transmitted to the child or it can only be transmitted to the character. The parent can initiate communication with the child in a similar manner. Video and audio of this communication can be transmitted to the character or it optionally may not.

Upon the end of an interaction, the video communication 24 can be terminated by any party to the interaction, including the parent. Upon termination of the interaction, the parties may be sent to a staging area, or the communication with the system 10 can be disconnected completely. Complete disconnection can include disconnection of the parties' computers 11, 12, 14 from the central computer 13 and the discontinuance of data transmission between the same.

In the event that data communication is maintained between the parent's computer 14 and the central computer 13, and the character's computer 11 and the central computer 13, marketing materials 20 can be sent from the character's computer 11 or the central computer 13 to the parent's computer 14. These marketing materials 20 can be preselected before the video interaction 24 took place, or be selected based upon the video interaction 24. Selection of marketing materials 20 can be made by the character's computer 11 or the central computer 30. The character's computer 11 can initiate the transmission of marketing materials 20 to the parent's computer 14 or the central computer 13 can initiate said transmission of marketing materials 20.

If communication between the parent's computer 14 and the rest of the system 10 is not maintained after the video interaction 24 between the child and the character is terminated, the central computer 13 or the character computer 11 can send marketing materials 20 to the parent's computer 14 through email or other similar messaging method.

Marketing materials 20 can include offers to buy or sell goods and services. The goods and services referred to in the marketing materials 20 can be offered by the operators of the disclosed system 10 or any other party.

The system 10 is not limited by the number of parties described in the embodiments disclosed herein. The above disclosure includes systems that can have multiple parties in place of the third party 14, multiple parties in place of the character 12, and multiple parties in place of the participant 12.

What is claimed is:

1. A system facilitating video engagement comprising:
   a computer;
   a request to arrange a video engagement with a person received by said computer from a third party;
   personal information about a participant party in the requested video engagement received by said computer;
   a video engagement between the person and the participant party which can be monitored by the third party, the video engagement using at least a portion of said personal information.

2. The system of claim 1, further comprising a database of people accessible by said computer, wherein the person is selected by the third party from the database of people.

3. The system of claim 1, wherein call information and time is input by the third party.

4. The system of claim 1, wherein payment authorization information is input by the third party.

5. The system of claim 1, wherein the computer transmits marketing interaction to the third party.

6. The system of claim 1, wherein the person transmits marketing interaction to the computer.

7. The system of claim 1, wherein the computer records the video engagement between the person and the participant and the computer stores the engagement in a calls database.

8. The system of claim 1, further comprising a second computer wherein the third party transmits information regarding at least one of the person and personal information about the participant.

9. The system of claim 1, wherein the third party can join the video engagement between the person and the participant.

10. The system of claim 1, wherein the third party can communicate with the person, exclusive of the participant, while the video engagement is in progress.

11. The system of claim 1, wherein the third party can terminate the video engagement.

12. The system of claim 1, wherein the participant party has a plurality of participant members.

13. The system of claim 12, wherein the personal information has a participant information about at least one participant member of the plurality of participant members.

14. The system of claim 2, wherein the database of people includes fictional characters.

15. A system facilitating video engagement comprising:
   a computer;
   a request to arrange a video engagement with a person received by said computer from a third party;
   personal information about a participant party in the requested video engagement received by said computer, the participant party having a plurality of participant members, and the personal information having a participant information about at least one participant member of the plurality of participant members;
   a video engagement between the person and the participant party which can be monitored by the third party, the video engagement using at least a portion of said personal information.

16. The system of claim 15, further comprising a database of people accessible by said computer, wherein the person is selected by the third party from the database of people.

* * * * *